Dec. 1, 1925.
J. H. HAZLEWOOD
APERTURE STOPPER
Filed Nov. 29, 1924
1,563,743
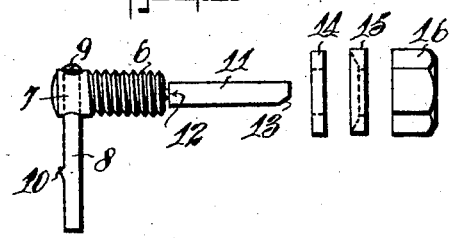
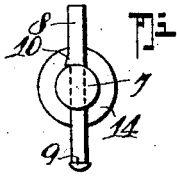
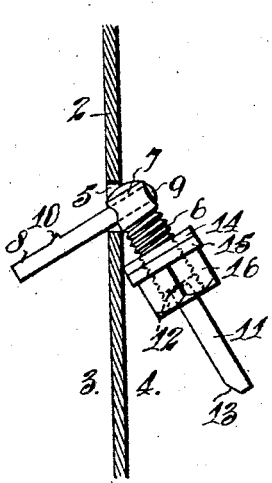
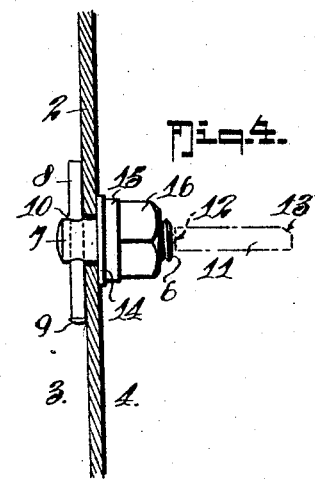
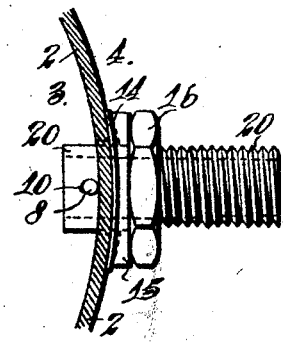
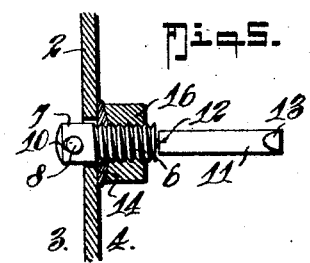
INVENTOR
John H. Hazlewood.
BY
Albert E. Dieterich
ATTORNEY Patented Dec. 1, 1925.

1,563,743

UNITED STATES PATENT OFFICE.

JOHN H. HAZLEWOOD, OF VANCOUVER, BRITISH COLUMBIA, CANADA.

APERTURE STOPPER.

Application filed November 29, 1924. Serial No. 752,927.

*To all whom it may concern:*

Be it known that I, JOHN H. HAZLEWOOD, a citizen of the Dominion of Canada, residing at Vancouver, in the Province of British Columbia, Canada, have invented certain new and useful Improvements in Aperture Stoppers, of which the following is a specification.

This invention relates to a leak stopper for a domestic water boiler or the like, and is designed to be readily applicable from without the boiler and effects the sealing of the leak aperture in a thorough and satisfactory manner.

The invention is fully described in the following specification, reference being made to the drawings by which it is accompanied, in which:

Fig. 1 shows the several parts of the device in elevation, the parts being withdrawn from one another for clearer explanation.

Fig. 2 is an end view of the stopper screw and its retaining means as shown in Fig. 1.

Fig. 3 shows the parts together as being inserted in the aperture of the boiler.

Fig. 4 shows the closure as effected.

Fig. 5 shows a modification in the form of the securing nut, and

Fig. 6 shows a modification in which the same means is applied to prevent leakage around a pipe connection to a boiler.

In these drawings 2 represents the shell of a domestic hot water boiler in which a leak has developed by corrosion or otherwise, which it is desired to stop, 3 being the inner and 4 the outer side of the boiler. A small leakage aperture is enlarged as at 5 to a practicable size to receive the stopper.

The stopper comprises a screw 6, the head 7 of which is transversely drilled to receive a cross bar 8 which is slightly headed at one end 9 to retain it in the aperture of the screw head, and intermediate the ends has a slight burr 10 formed on it that will check endwise movement of the cross bar in the screw head 7 with the ends projecting equally from each side.

Integral with or secured to the other end of the screw 6 is a stem 11, which being merely intended to facilitate insertion of the screw into the aperture to be sealed, has a line of weakness 12 at its connection to the screw that the stem 11 may be broken off after the stopper is made secure in the aperture.

This stem 11 has a flattened portion 13 or other suitable distinguishing mark on the same side of the screw as the burr 10 of the cross bar, the object of which will be explained later.

On the screw 6 is applied a sealing washer 14 preferably of a soft metal, such as lead, and next to it a metal washer 15, the side of which toward the sealing washer 14 is concave to retain the soft washer against the tendency to spread outward and to crowd it against the threads of the screw 6 when the nut 16 is applied to secure the stopper.

The stopper is applied, as shown in Fig. 3, the sealing washer 14, retaining washer 15 and nut 16 being entered on the thread of the screw 6 and the head 9 of the cross bar 8 being against the head 7 of the screw, in which position the indicating flat 13 of the stem 11 is directed downward. The cross bar 8 is then passed angularly into the aperture 5 of the boiler 2 and the axis of the screw is then moved upward to a position substantially normal to the face of the boiler shell, in which movement the head of the screw is passed through the aperture 5.

The screw 6, 7 is then partially rotated in the aperture by the stem 11 until the indicating flat 13 is uppermost, in which position the cross bar 8 will drop endwise across the aperture, as shown in Fig. 4, being stopped by the projection 10 of the cross bar.

While the screw 6 is held in this position by the stem 11, the nut 16 is screwed toward the plate 2 of the boiler and the washer 15 crushes the soft sealing washer 14 against the outside of the plate, and that washer being prevented from expanding outward, its soft metal is, by the concavity of the washer 15, crushed inward tightly against the thread of the screw 6 and effectively seals the aperture.

The stem 11 may then be broken off and the end of the threaded portion of the screw may be smoothed off with a file.

Although I prefer to use the washer 15, the nut 16 may, as shown in Fig. 5, have a concave surface to bear directly against the sealing washer 14 and effect the desired result.

The same device may be applied with slight modification to enable a pipe connection to be made to a boiler or tank where one side thereof is not accessible except through the aperture, and to prevent leakage around the pipe connection.

In this case, as shown in Fig. 6, the end of the threaded pipe or nipple 20 to be inserted is drilled transversely to receive the cross bar or bars 8, each having the head 9 and medial check 10, and the concave face of the washer 15 should be shaped to conform to the surface of the boiler. As this pipe 20 will require to be of sufficient length to enable connection to be made to its outer end, the removable stem extension 11 is not required.

I am aware that attempts have heretofore been made to effect the closure of a leakage aperture by devices similar in principle to what is here set forth, but in those with which I am acquainted the cross bar, corresponding to my bar 8, has been pin-connected to the head of the screw. That pin-connection cannot, with the limited material available, be made of sufficient size to withstand the tension of the screw, and the pin is readily sheared.

Further, no provision has heretofore been made for retaining the sealing washer against outward expansion and for crowding it against the thread of the bolt to prevent leakage past it.

I, therefore, claim as my invention and desire the protection of Letters Patent on the device as set forth in the following claims:

1. Means for closing an aperture in a plate, one side of which plate is not accessible except through the aperture, said means comprising a screw adapted to pass into the aperture and transversely apertured at one end, a cross bar endwise movable in the transverse aperture of the screw, said bar having at one end means preventing its withdrawal and between that and the other end means preventing movement beyond a medial position in the screw, a nut threaded on the screw, and a sealing washer of soft material between the nut and the cross bar.

2. Means for closing an aperture in a plate, one side of which plate is not accessible except through the aperture, said means comprising a screw adapted to pass into the aperture and transversely apertured at one end and at the other end having a stem removably secured to it, a cross bar endwise movable in the transverse aperture of the screw, said bar having at one end means preventing its withdrawal and between that and the other end means preventing movement beyond a medial position in the screw, a nut threaded on the screw, and a sealing washer of soft material between the nut and the cross bar.

3. Means for closing a small aperture in a plate, one side of which is not accessible except through the aperture, said means comprising a screw adapted to pass into the aperture and transversely apertured at one end and at the other end having a stem removably secured to it, a cross bar endwise movable in the transverse aperture of the screw, said bar having at one end means preventing its withdrawal and between that and the other end means preventing movement beyond a medial position in the screw, a nut threaded on the screw, a sealing washer of soft material between the nut and the cross bar, and means for forcing the material of the washer inward against the threads of the screw when it is crushed by the nut against the plate.

4. Means for closing a small aperture in a plate, one side of which is not accessible except through the aperture, said means comprising a screw having a stem extending from one end with a line of weakness at its connection to the screw, a cross bar endwise movable in an aperture across one end of the screw, said cross bar having provision at one end preventing its withdrawal from the aperture of the screw, and means for checking endwise movement of it beyond the medial position in the screw, a nut fitting the thread of the screw, a sealing washer between the nut and the cross bar, and a washer between the nut and the sealing washer having an inwardly directed conical surface where it bears on the sealing washer.

In testimony whereof I affix my signature

JOHN H. HAZLEWOOD.